US010555035B2

United States Patent
Colombo et al.

(10) Patent No.: US 10,555,035 B2
(45) Date of Patent: Feb. 4, 2020

(54) HIGH-SPEED PARALLEL ENGINE FOR PROCESSING FILE-BASED HIGH-RESOLUTION IMAGES

(71) Applicant: Disney Enterprises, Inc., Burbank, CA (US)

(72) Inventors: Giovanni Colombo, Pasadena, CA (US); Scott Erickson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 216 days.

(21) Appl. No.: 15/619,291

(22) Filed: Jun. 9, 2017

(65) Prior Publication Data
US 2018/0359521 A1  Dec. 13, 2018

(51) Int. Cl.
| | | |
|---|---|---|
| *H04N 21/4402* | (2011.01) | |
| *H04L 29/08* | (2006.01) | |
| *H04L 29/06* | (2006.01) | |
| *H04N 21/2343* | (2011.01) | |
| *H04N 19/436* | (2014.01) | |
| *H04N 21/433* | (2011.01) | |

(52) U.S. Cl.
CPC ........ *H04N 21/4402* (2013.01); *H04L 65/601* (2013.01); *H04L 67/06* (2013.01); *H04N 19/436* (2014.11); *H04N 21/2343* (2013.01); *H04N 21/433* (2013.01)

(58) Field of Classification Search
CPC ..... H04L 67/06; H04L 65/601; H04N 19/436; H04N 21/2343
See application file for complete search history.

(56) References Cited

U.S. PATENT DOCUMENTS

| | | | | |
|---|---|---|---|---|
| 6,577,311 B1* | 6/2003 | Crosby | ............... | G06F 16/9577 345/428 |
| 8,369,653 B1* | 2/2013 | Cohen | ....................... | G06T 3/40 382/298 |
| 8,418,068 B1* | 4/2013 | Backus | .............. | H04N 1/00167 345/619 |
| 9,998,769 B1* | 6/2018 | Fernandes | ...... | H04N 21/234309 |
| 2004/0120591 A1* | 6/2004 | Brower | .................. | H04N 19/63 382/240 |
| 2004/0216173 A1* | 10/2004 | Horoszowski | ....... | G11B 27/034 725/145 |
| 2004/0268224 A1* | 12/2004 | Balkus | ................. | G11B 27/034 715/203 |

(Continued)

*Primary Examiner* — Lashonda T Jacobs
(74) *Attorney, Agent, or Firm* — Patterson + Sheridan, LLP

(57) ABSTRACT

Systems, methods, and computer program products to perform an operation comprising receiving a request to generate a video of a specified resolution based on a plurality of media files, the plurality of media files comprising image files corresponding to a respective frame of a plurality of frames of the generated video, determining a size of a transfer unit based at least in part on the specified resolution and a count of the plurality of media files, generating a plurality of transfer units of the determined size, wherein the plurality of transfer units comprise a respective subset of the plurality of media files, and assigning the plurality of transfer units for parallel processing by a plurality of image processing applications executing on a plurality of compute cores of a plurality of compute nodes in a render farm.

20 Claims, 6 Drawing Sheets

(56) References Cited

U.S. PATENT DOCUMENTS

| | | | |
|---|---|---|---|
| 2005/0052469 A1* | 3/2005 | Crosby | G06F 16/9577 345/619 |
| 2010/0050080 A1* | 2/2010 | Libert | G06F 16/434 715/716 |
| 2011/0307782 A1* | 12/2011 | Demarta | G11B 27/102 715/716 |
| 2012/0023148 A1* | 1/2012 | Long | H04N 19/164 707/827 |
| 2012/0250755 A1* | 10/2012 | Ratner | H04N 19/156 375/240.01 |
| 2013/0049998 A1* | 2/2013 | English | H04L 65/605 341/51 |
| 2014/0012975 A1* | 1/2014 | Wang | G06F 11/0793 709/224 |
| 2014/0082146 A1* | 3/2014 | Bao | H04L 65/605 709/219 |
| 2014/0153909 A1* | 6/2014 | MacInnis | H04N 19/436 386/353 |
| 2015/0281710 A1* | 10/2015 | Sievert | H04N 19/164 375/240.02 |
| 2016/0173959 A1* | 6/2016 | Seema | H04N 21/8456 725/116 |
| 2018/0047130 A1* | 2/2018 | Yang | G06T 15/20 |

* cited by examiner

FIG. 2

HIGH-SPEED PARALLEL ENGINE FOR PROCESSING FILE-BASED HIGH-RESOLUTION IMAGES

BACKGROUND

Field of the Disclosure

Embodiments disclosed herein relate to video production systems. More specifically, embodiments disclosed herein relate to video production systems that leverage high-speed parallel engines for processing file-based high-resolution images.

Description of the Related Art

Videos are often produced using large numbers of files that include frame-accurate audio data and/or video data. Often, many users leveraging different software tools and hardware systems create the files. However, final processing is required to convert the files to one or more videos that are of one or more production-certified formats. The final processing often includes multiple stages of processing, where the files are transferred and processed multiple times on any number of systems. Conventionally, the transfer and final processing stages occurred serially, which offers poor scalability and is very time consuming.

SUMMARY

In one embodiment, a method comprises receiving a request to generate a video of a specified resolution based on a plurality of media files, the plurality of media files comprising image files corresponding to a respective frame of a plurality of frames of the generated video, determining a size of a transfer unit based at least in part on the specified resolution and a count of the plurality of media files, generating a plurality of transfer units of the determined size, wherein the plurality of transfer units comprise a respective subset of the plurality of media files, and assigning the plurality of transfer units for parallel processing by a plurality of image processing applications executing on a plurality of compute cores of a plurality of compute nodes in a render farm.

In another embodiment, a system comprises a computer processor and a memory containing a program which when executed by the processor performs an operation comprising receiving a request to generate a video of a specified resolution based on a plurality of media files, the plurality of media files comprising image files corresponding to a respective frame of a plurality of frames of the generated video, determining a size of a transfer unit based at least in part on the specified resolution and a count of the plurality of media files, generating a plurality of transfer units of the determined size, wherein the plurality of transfer units comprise a respective subset of the plurality of media files, and assigning the plurality of transfer units for parallel processing by a plurality of image processing applications executing on a plurality of compute cores of a plurality of compute nodes in a render farm.

In another embodiment, a computer program product comprises a computer-readable storage medium having computer-readable program code embodied therewith, the computer-readable program code executable by a processor to perform an operation comprising receiving a request to generate a video of a specified resolution based on a plurality of media files, the plurality of media files comprising image files corresponding to a respective frame of a plurality of frames of the generated video, determining a size of a transfer unit based at least in part on the specified resolution and a count of the plurality of media files, generating a plurality of transfer units of the determined size, wherein the plurality of transfer units comprise a respective subset of the plurality of media files, and assigning the plurality of transfer units for parallel processing by a plurality of image processing applications executing on a plurality of compute cores of a plurality of compute nodes in a render farm.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 2 illustrates an example graphical user interface to a high-speed parallel engine for processing file-based high-resolution images, according to one embodiment.

DETAILED DESCRIPTION

Embodiments disclosed herein provide enhanced video production techniques for the transfer and processing of file-based, high-resolution images. Generally, a user may specify to initiate the production of a video based on a plurality of image files. To produce the video, embodiments disclosed herein optimize the use of a render farm comprising a plurality of compute nodes by determining an optimal size of a transfer unit, which includes one or more of the image files. The optimal size of the transfer unit is determined based on one or more of a requested resolution of the video, a set of user-specified parameters, the hardware resources of the compute nodes, the bandwidth of each of a plurality of network segments, the use of the hardware resources of the compute nodes, and the use of the bandwidth of the plurality of network segments. The image files are then assembled into a plurality of transfer units of the determined optimal size. For example, if the optimal size of the transfer unit is 32 frames (e.g., 32 images), and there are 32,000 images, 1,000 transfer units are assembled and scheduled for parallel processing on the compute cores of the compute nodes in the render farm. Generally, the parallel processing includes transferring and processing of groups of the assembled transfer units. For example, if the render farm includes 100 compute cores, the render farm would process 10 groups of 100 transfer units, where each compute core processes one of the 100 transfer units in each group. As the compute cores process each group of transfer units, the compute cores transfer each processed transfer unit in the group via the network to a storage device (e.g., a digital disk recorder) for assembly and storage as a video formatted according to one or more input parameters.

Figure 1:
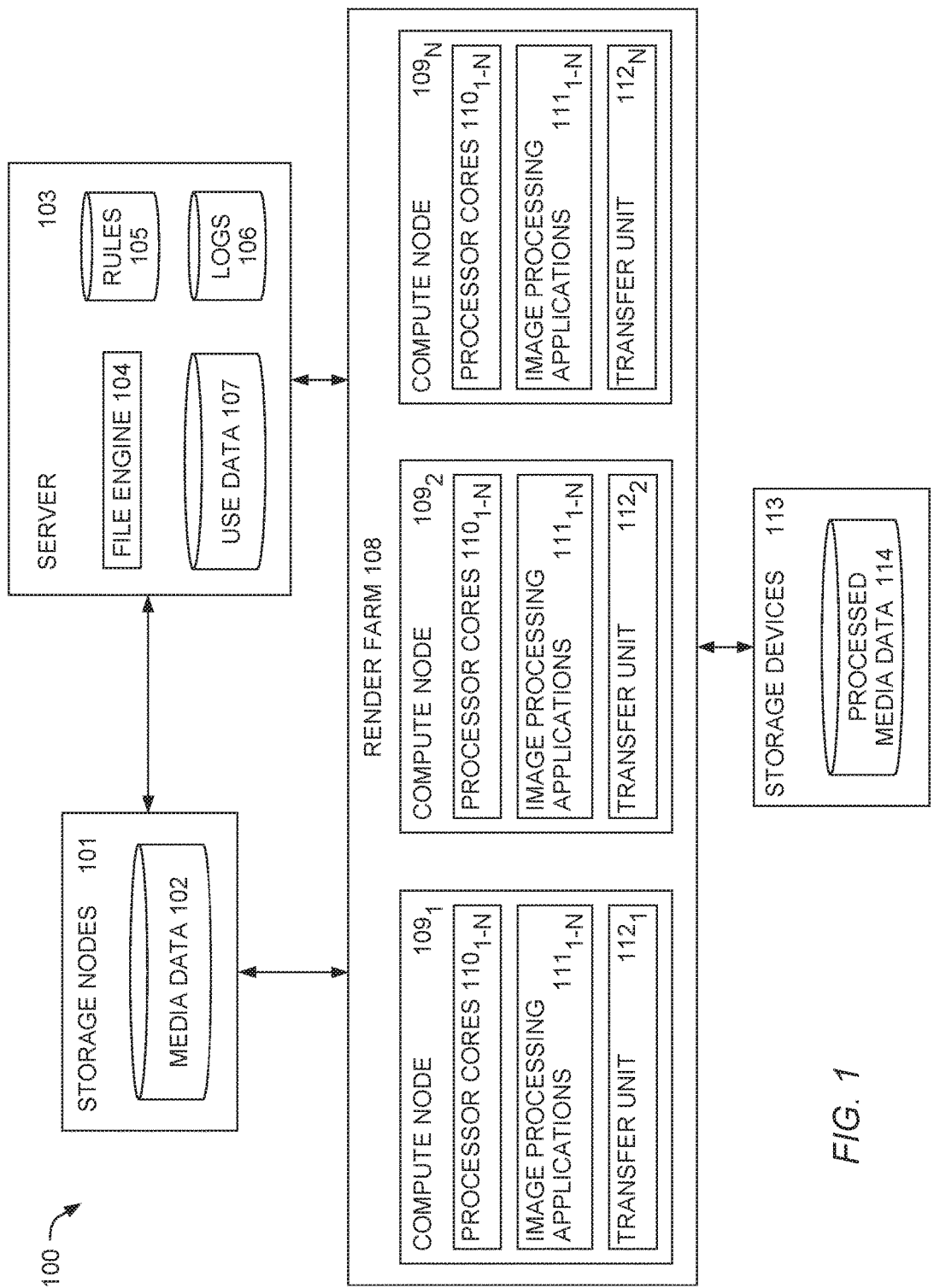
FIG. 1 illustrates a system architecture which provides a high-speed parallel engine for processing file-based high-resolution images, according to one embodiment.

FIG. 1 illustrates a system architecture 100 which provides a high-speed parallel engine for processing file-based high-resolution images, according to one embodiment. As shown, the system 100 includes one or more storage nodes 101, a server 103, a render farm 108, and one or more storage devices 113. The storage nodes 101 include a data store of media data 102, which include and image files and audio files. In at least one embodiment, the image files may store raw image data in the red green blue (RGB) color space. Example file extensions for image files in the RGB color space include the .tiff, .rgb, and .sgi file extensions. The image files in the media data 102 are associated with metadata that specifies an order of the image files, such that the image files, when processed, can be assembled into a frame-accurate video. The image files stored in the media data 102 may be uncompressed and/or compressed according to a lossless compression format.

As shown, the server 103 includes a file engine 104, a data store of rules 105, a data store of logs 106, and a data store of use data 107. The file engine 104 is generally configured to orchestrate the scheduling and processing of image files in the media data 102 to create videos of a requested format. The file engine 104 further provides graphical user interfaces (GUIs) that allow users to schedule processing of a job of one or more image files by the render farm 108 to create a video of a specified resolution and color space (among other user-specified formatting parameters). The file engine 104 further regulates all traffic directed to the same target in the render farm 108 (e.g., the compute nodes $109_{1-N}$ and/or the processor cores $110_{1-N}$), such that different jobs do not interfere with each other.

As shown, the render farm 108 includes a plurality of compute nodes $109_{1-N}$, each of which may be a physical or virtualized computing system. Although three example compute nodes $109_{1-N}$ are depicted, any number and type of compute nodes 109 may be deployed in the render farm. As shown, the compute nodes $109_{1-N}$ each includes one or more processor cores $110_{1-N}$ of one or more CPUs (not pictured) of each compute node. The compute nodes $109_{1-N}$ further include image processing applications $111_{1-N}$, which are representative of any type of image processing application. For example, the image processing applications $111_{1-N}$ include rendering applications, transcoding applications, assembly applications, applications for gamma correction, applications for cropping an image, applications to apply one or more filters to the image data, applications to convert the color space of the images (e.g. from RGB to the YUV color space), and the like.

Generally, the storage devices 113 are representative of any type of storage device that can store video data (and corresponding audio data) generated by the image processing applications $111_{1-N}$ as the processed media data 114. Example storage devices include digital disk recorders, network attached storage devices, storage nodes, and the like.

Returning to the server 103, the file engine 104 is further configured to determine an optimal size of a transfer unit (e.g., one or more image files) for a given processing job (e.g., a request to generate a video from images and/or audio files stored in the media data 102). The file engine 104 determines the optimal size of the transfer unit for a job based on one or more of a requested resolution for video frames generated by processing the job, a number and/or size of images from the media data 102 provided as input to the job, and an actual and/or forecasted use of system resources while processing the job (e.g., the compute cores $109_{1-N}$ available to process the job). More generally, the system resources may include processors (CPUs), memory, input/output (I/O) speeds of storage devices 113 and the devices storing the media data 102, and network bandwidth. The file engine 104 may determine the current use of system resources based on the use data 107, which receives and stores information reflecting the current use of resources in the system 100 (e.g., network bandwidth for all network segments, current use of system resources in the render farm 108, use of resources on the storage devices 113, etc.). Furthermore, the file engine 104 may consider the logs 106 when determining the optimal size of a transfer unit. The logs 106 include information describing previous jobs, such as the number of input frames for a job, the requested video resolution, the available system resources for the job, the levels of network traffic, and the determined size of an optimal transfer unit for the job. Further still, the file engine 104 may consider rules in the rules 105 when determining the size of a transfer unit for a video processing job. In at least one embodiment, the file engine 104 determines the optimal size to optimize the use of available network bandwidth in the system 100, which is often the bottleneck of any type of file transfer.

For example, the file engine 104 may determine that the optimal size of a transfer unit for a processing job to create a video of 4K resolution may be 96 images. Once determined, the file engine 104 generates transfer units $112_{1-N}$ (of 96 images each) from the source images in the media data 102. The file engine 104 generally schedules the transfer units $112_{1-N}$ for processing on the processor cores $110_{1-N}$ of the compute nodes $109_{1-N}$. For example, for an example time of t=0, the file engine 104 may schedule transfer unit $112_1$ for processing on processor core $110_1$ of compute node $109_1$, schedule transfer unit $112_2$ for processing on processor core $110_1$ of compute node $109_2$, and schedule transfer unit $112_3$ for processing on processor core $110_N$ of compute node $109_N$. The specific applications $111_{1-N}$ that process the image files of each transfer unit $112_{1-N}$ are selected based on input parameters specified by the user. Once processed, the processor cores $110_{1-N}$ transmit the processed transfer units $112_{1, 2, 3}$ to the storage device 113 for storage as the processed media data 114. Therefore, the system 100 processes and transfers a group of transfer units $112_{1-N}$ in parallel. Continuing with this example, for an example time of t=1, the file engine 104 may schedule transfer unit $112_4$ for processing on processor core $110_4$ of compute node $109_1$, schedule transfer unit $112_5$ for processing on processor core $110_6$ of compute node $109_2$, and schedule transfer unit $112_6$ for processing on processor core $110_N$ of compute node $109_N$. Although a group of transfer units $112_{1-N}$ is three transfer units $112_{1-N}$ in this example, the group of transfer units may be of any size less than or equal to the total number of transfer units $112_{1-N}$. In one embodiment, the size of the group of transfer units $112_{1-N}$ is based on the number of processor cores $110_{1-N}$ selected to process a transfer unit $112_N$ (e.g, if 50 processor cores $110_{1-N}$ are selected, the group size would be 50 transfer units $112_{1-N}$). The total number of transfer units is based on the number of input images from the media data 102 provided as input to the job (e.g., the number of input images divided by the size of the transfer unit).

The file engine 104 is also configured to monitor the health of the system 100 when the render farm 108 is processing a job. If the use of a particular system resource exceeds a threshold, the file engine 104 may reconfigure the deployment of transfer units $112_{1-N}$ accordingly. For example, use of a compute core $109_N$ exceeds a CPU utilization threshold, the file engine 104 may move subsequently scheduled transfer units from the compute core $109_N$ to a different compute core $109_M$. As another example, if a network segment connected to a compute node $108_N$ has a bandwidth utilization that is lower than a minimum utilization threshold, the file engine 104 may reallocate transfer units $112_N$ to the compute node $108_N$ in an attempt to increase the bandwidth on the network segment. As another example, if a storage device 113 is experiencing I/O utilization that exceeds a threshold, the file engine 104 may delay the timing of a job until the I/O utilization is lower than the threshold.

In at least one embodiment, one or more of the image processing applications $111_{1-N}$ renders a video frame for each image file in each transfer unit $112_{1-N}$. The image processing applications $111_{1-N}$ may leverage a timeline that specifies an order of each generated video frame in the finalized video (and/or an order of the input images from the media data 102). In at least one embodiment, the storage devices 113 include logic to create an ordered, frame-accurate video of video frames that is stored in the processed media data 114. For example, the image processing applications $111_{1-N}$ may process transfer units $112_{1,2,3}$, and specify an ordering of each resultant frame of video to the storage device 113, which are then stored in the appropriate order in the processed media data 114. When the image processing applications $111_{1-N}$ subsequently process transfer units $112_{4,5,6}$, the image processing applications $111_{1-N}$ again specify an ordering of each resultant frame of video to the storage device 113, which stores the frames in the appropriate order considering the frames generated and stored based on the processed transfer units $112_{1,2,3}$.

Figure 2:
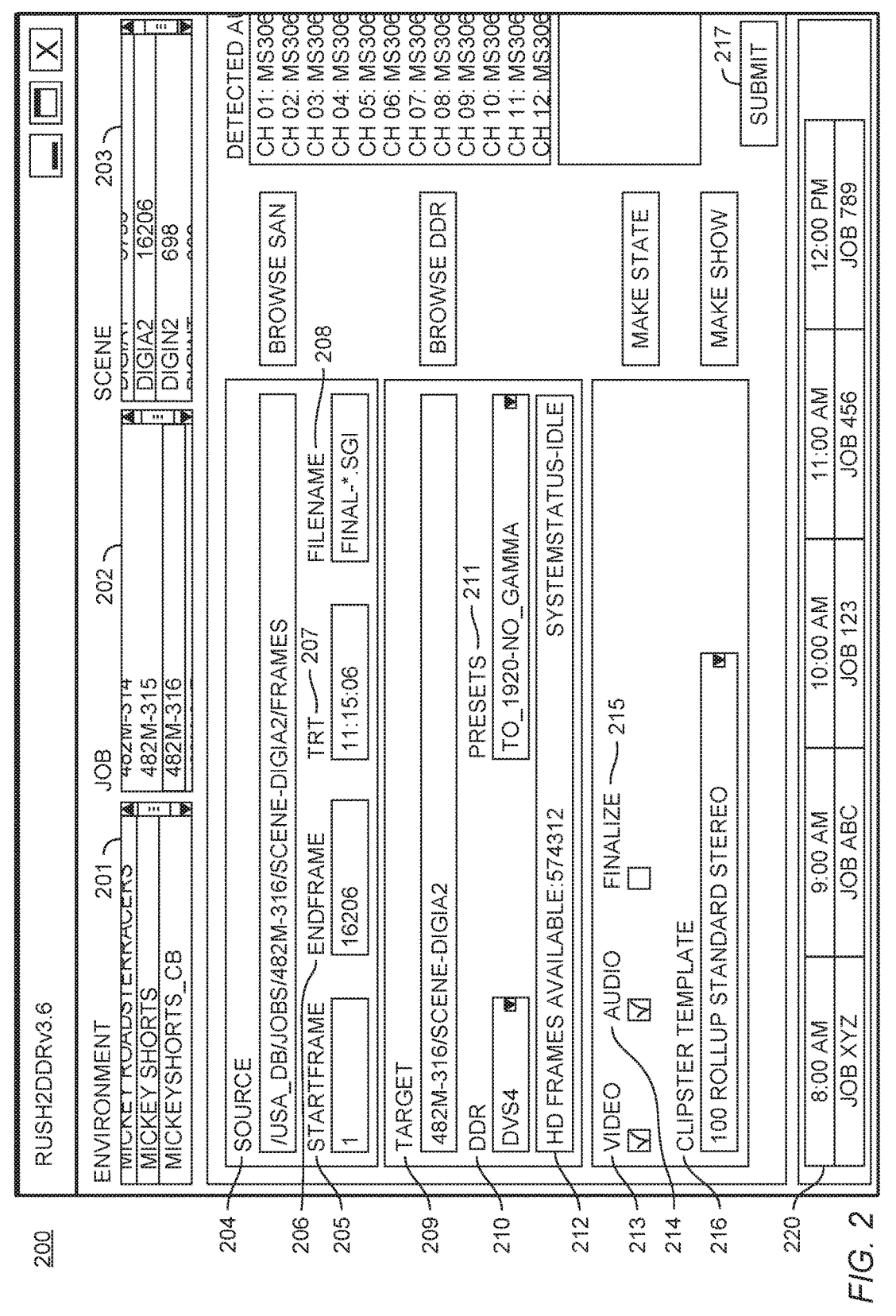

FIG. 2 illustrates an example GUI 200 to the file engine 104 for processing file-based high-resolution images, according to one embodiment. As shown, the GUI 200 includes selection fields 201-203 which generally correspond to different views of the image files stored in the media data 102. The selection field 201 may correspond to a particular media title, such as a television show. Therefore, the selection field 201 outputs a plurality of media titles having associated data in the media files 102. Once the user selects a media title in the selection field 201, the selection field 202 outputs a plurality of episodes (or individual production instances) for the media title. Once a user selects an episode, the selection field 203 outputs a plurality of units of the episode in the selection field 203. The units of the episode outputted in the selection field 203 may include a single image, or a group of images (e.g., a scene of the episode). The user may then select one or more units of the episode from the selection field 203.

As shown, the GUI 200 also includes elements 204-216 for receiving user input. The input element 204 corresponds to a source (e.g., a uniform resource identifier (URI)) of image files and/or audio files in the media data 102. The input element 205 allows a user to specify a starting frame for the video, which corresponds to an image file in the media data 102. The input element 206 allows the user to specify an end frame of the video, which corresponds to an image file in the media data 102. The element 207 specifies the total running time of the video, which is programmatically generated based on the number of frames between start and end frames specified in the input elements 204, 205, respectively. The input element 208 allows the user to specify a filename for the output video produced by the render farm 108.

The input element 209 allows the user to select one of the storage devices 113 to store the output video. The input element 211 is a dropdown list of preset processing templates. The preset processing templates specify at least a resolution of the output video (e.g., 1920 by 1080 lines of resolution), whether to apply gamma correction, and whether to crop the images. As shown, the user has specified to generate a video with 1920×1080 resolution and no gamma correction applied. The element 212 specifies a storage capacity and status of the storage device 113 selected in input element 209, and a status of the selected storage device 113. The input element 213 allows a user to specify whether to process audio files associated with the selection from selection field 203. Generally, if audio files are selected, the audio files are not processed by the image processing applications $111_{1-N}$. However, the audio files may be included in a transfer unit $112_{1-N}$, and transferred in the system 100 via the same parallel approach as the image files.

The input element 215 allows the user whether to invoke one or more finalize applications $111_{1-N}$. Generally, the finalize application renders the timeline of video frames for the requested video, and assembles the resultant image and audio data of the requested video, which is stored on the specified storage device 113. The template used to assemble the finalized video is specified in input element 216.

As shown, the GUI 200 includes a scheduling calendar 220 which allows a user to browse the availability of each storage device 113. The user may select a time and/or date for scheduling the job in the calendar 220. Once the user has specified the relevant input parameters (or has not modified default parameters outputted when the GUI 200 is rendered), the user may submit the job using the submit button 217, which schedules the job for processing at the specified time and date.

Figure 3:
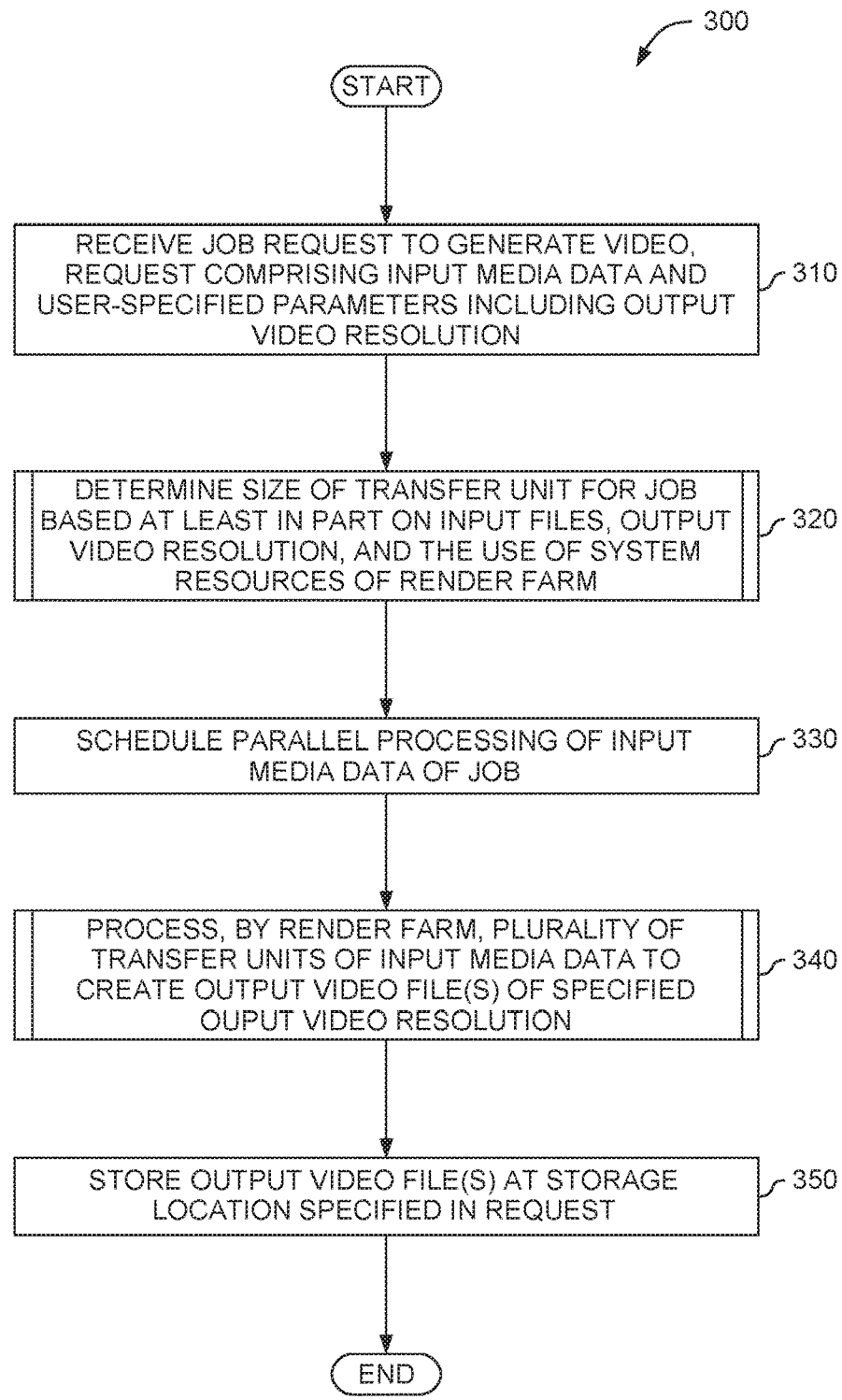
FIG. 3 is a flow chart illustrating a method to provide a high-speed parallel engine for processing file-based high-resolution images, according to one embodiment.

FIG. 3 is a flow chart illustrating a method 300 to provide a high-speed parallel engine for processing file-based high-resolution images, according to one embodiment. As shown, the method 300 begins at block 310, where the file engine 104 receives a job request specifying to generate a video, e.g., from the GUI 200. The request specifies a plurality of image and/or audio files from the media data 102, a resolution for the video, a time to process the job, and any other parameters (e.g., whether to apply gamma correction, letterbox, etc.). At block 320, described in greater detail with reference to FIG. 4, the file engine 104 determines the size of transfer units $112_{1-N}$ for the job based at least in part on the input files of media data 102 (e.g., a count of the input files, a size of the input files, etc.), the requested resolution of the video, and the use of system resources in the system 100 (including the network connections). At block 330, the file engine 104 schedules parallel processing of the input media data of the job. Generally, to schedule the processing of the job, the file engine 104 reserves the relevant resources and optionally creates a calendar entry for the job in a calendar application of the requesting user.

At block 340, described in greater detail with reference to FIG. 5, the render farm processes the transfer units $112_{1-N}$ of the input media data to create one or more output video files (which include image and/or audio data), thereby creating a video of the requested output resolution. Generally, at block 340, the file engine 104 initiates the transfer units $112_{1-N}$ of the job to the render farm 108 via a network. The processing applications 111 of the render farm 108 processes the transfer units $112_{1-N}$ in parallel. Doing so saturates the network and optimizes the time and/or resources used to generate a video from the files in the media data 102. At block 350, the output video files are stored at the storage location specified in the request.

Figure 4:
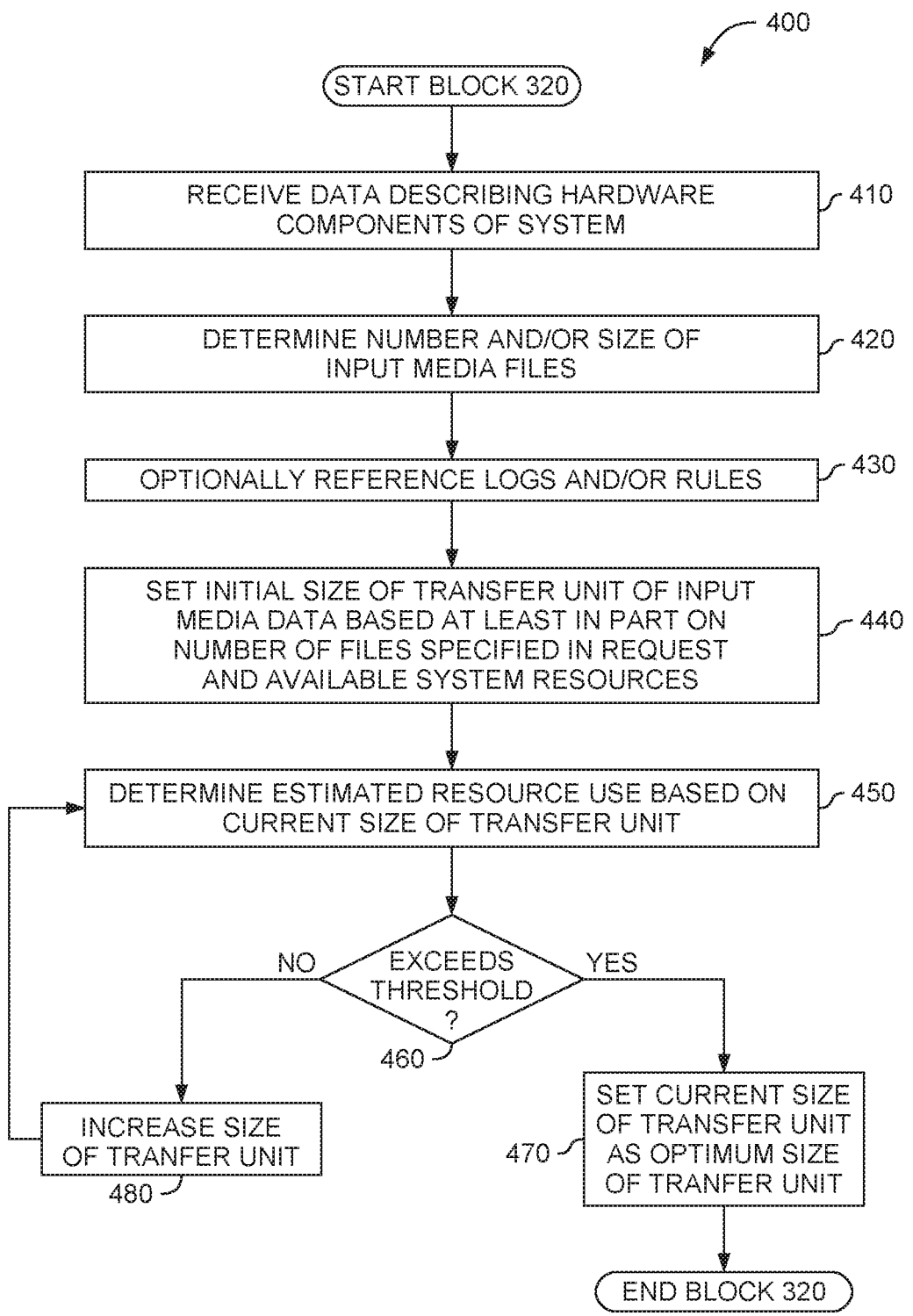
FIG. 4 is a flow chart illustrating a method to determine a size of a transfer unit of input media data, according to one embodiment.

FIG. 4 is a flow chart illustrating a method 400 corresponding to block 320 to determine a size of a transfer unit of input media data, according to one embodiment. As shown, the method 400 begins at block 410, where the file engine 104 receives data describing the hardware components of the system 100, including the render farm 108, the storage devices 113, storage nodes 101, and each segment of the network in the system 100. For example, the file engine 104 may receive data from the use data 107 which describes the capabilities of each hardware component and the current use of each component. The file engine 104 may further reference the logs 106 to determine an estimated resource use for the hardware components of the system 100 by processing the job. At block 410, the file engine 104 determines the number of input media files 102 specified in the request. For example, the file engine 104 may determine that the user specified to generate a video based on 32,000 input files in the media data (which may include image and/or audio files). The file engine 104 may also determine the size of each file by referencing metadata associated with each file in the media data 102. Doing so allows the file engine 104 to determine a total size of the input media data 102, which is relevant in determining the size of the transfer units $112_{1-N}$ for the job.

At block 430, the file engine 104 optionally references the rules 105 to determine whether any rules are applicable to the current job. For example, the rules 105 may specify threshold sizes of transfer units $112_{1-N}$ that are associated with a requested output video resolution (e.g., a transfer unit must be at least 24 frames for a 2K video, at least 48 frames for a 4K video, etc.). The rules 105 may also specify resource use thresholds applicable to a given job. At block 440, the file engine 104 sets an initial size of the transfer unit 112 based at least in part on the number of files specified in the request and the available system resources. By setting the initial threshold, the file engine 104 may fine-tune the threshold to the specific parameters of the request and the current state of the system 100, including any relevant network segments. At block 450, the file engine 104 determines an estimated resource use based on the current size of the transfer unit 112. For example, the file engine 104 may consider the processing resources and network resources used in processing the input media files. At block 460, the file engine 104 determines whether the estimated use of resources exceeds an applicable threshold. If the estimated use of one resource does not exceed the threshold, the file engine 104 proceeds to block 480, where the file engine 104 increases the size of the transfer unit (e.g., from 16 to 24 files). For example, if the estimated use of the compute cores $109_N$ based on the current size of the transfer unit is 40%, while the threshold is 70%, the file engine 104 would increase the size of the transfer unit to increase CPU utilization. Similarly, if the estimated network bandwidth use is 60% of the maximum bandwidth, and the threshold is 80%, the file engine 104 would increase the size of the transfer unit to utilize more bandwidth. The method 400 would then return to block 450. Returning to block 460, if the estimated resource use exceeds the threshold, the file engine 104 proceeds to block 470, where the file engine 104 sets the current size of the transfer unit as the optimum size of the transfer unit.

Figure 5:
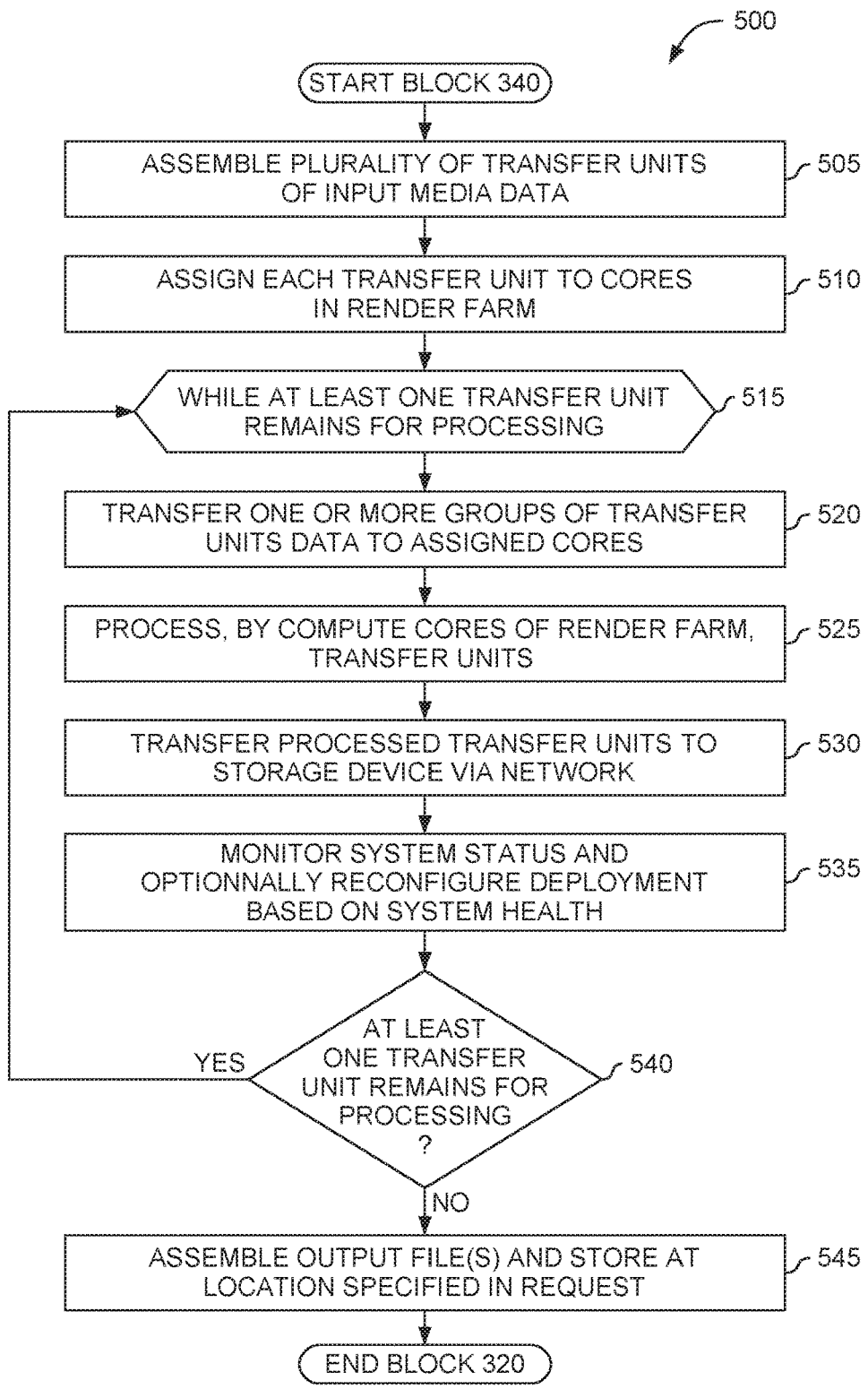
FIG. 5 is a flow chart illustrating a method to process a plurality of transfer units of input media data by a render farm, according to one embodiment.

FIG. 5 is a flow chart illustrating a method 500 corresponding to block 340 to process a plurality of transfer units of input media data by a render farm, according to one embodiment. As shown, the method 500 begins at block 505, where the file engine 104 assembles a plurality of transfer units of the input media data. For example, if the size of the transfer unit is 24 frames, the file engine 104 would assemble transfer units of 24 image and/or audio files from the media data 102. If the total number of input files was 24,000 input files for the job, the file engine 104 would create 1,000 transfer units $112_{0-999}$, with each transfer unit $112_{0-999}$ having 24 input files from the media data 102. At block 510, the file engine 104 assigns each transfer unit $112_{1-N}$ assembled at block 505 to a processor core $109_{1-N}$ on the compute nodes $108_{1-N}$. Generally, the file engine 104 attempts to load-balance the allocation of transfer units $112_{1-N}$ on the processor cores $109_{1-N}$ of the compute nodes $108_{1-N}$. Generally, the file engine 104 would attempt to evenly distribute the transfer units $112_{1-N}$ amongst compute cores $109_{1-N}$ of a given compute node $108_N$, as well as amongst the compute nodes $108_{1-N}$, based on the current use of resources on each compute node $108_{1-N}$ and/or compute core $109_{1-N}$, as well as the use of network segments in the network.

At block 515, the file engine 104 executes a loop including blocks 520-540 while at least one transfer unit of input media files remains pending for processing by the render farm 108. At block 520, the file engine 104 transfers (or causes the transfer of) one or more groups of transfer units $112_{1-N}$ to the assigned compute cores $109_{1-N}$. In some embodiments, the file engine 104 transfers groups of transfer units $112_{1-N}$ based on the number of compute nodes $108_{1-N}$ and/or compute cores $109_{1-N}$ scheduled to process at least one transfer unit $112_{1-N}$. For example, in such embodiments, if 36 compute cores $109_{1-N}$ are scheduled to process at least one transfer unit $112_N$, the files of groups of 36 transfer units $112_{1-N}$ are transferred in parallel. However, in other embodiments, the files of the transfer units $112_{1-N}$ are continuously transferred to the respective compute nodes $108_{1-N}$, where the files of the transfer units $112_{1-N}$ are queued for processing.

At block 525, the image processing applications $111_{1-N}$ executing on the compute cores $109_{1-N}$ process the image files of the assigned transfer units $112_{1-N}$. Generally, processing the image files includes at least changing the color space of the image files from the RGB space to the YUV space, and generating a frame of video at the specified resolution for each respective image file. At block 530, the compute cores $109_{1-N}$ transfer the processed transfer units $112_{1-N}$ to the storage device 113 via the network. At block 535, the file engine 104 monitors the status of the system 100, including any network segments, and optionally reconfigures the deployment based on the health of the system. For example, if a compute node $109_N$ is processing images slowly, the file engine 104 may reallocate the images scheduled for processing on the compute node $109_N$ to a different compute node $109_M$. At block 540, the file engine 104 determines whether more transfer units $112_{1-N}$ remain for processing. If more transfer units $112_{1-N}$ remain for processing, the method returns to block 515. Otherwise, the method proceeds to block 545, where the output files of the video (which may include image and/or audio data) are assembled and stored at the location in the storage device 113 specified in the request. Furthermore, the file engine 104 may update the logs 106 to reflect the amount of time and/or resources used (and to what level of use) after the video has been processed by the render farm 108.

Figure 6:
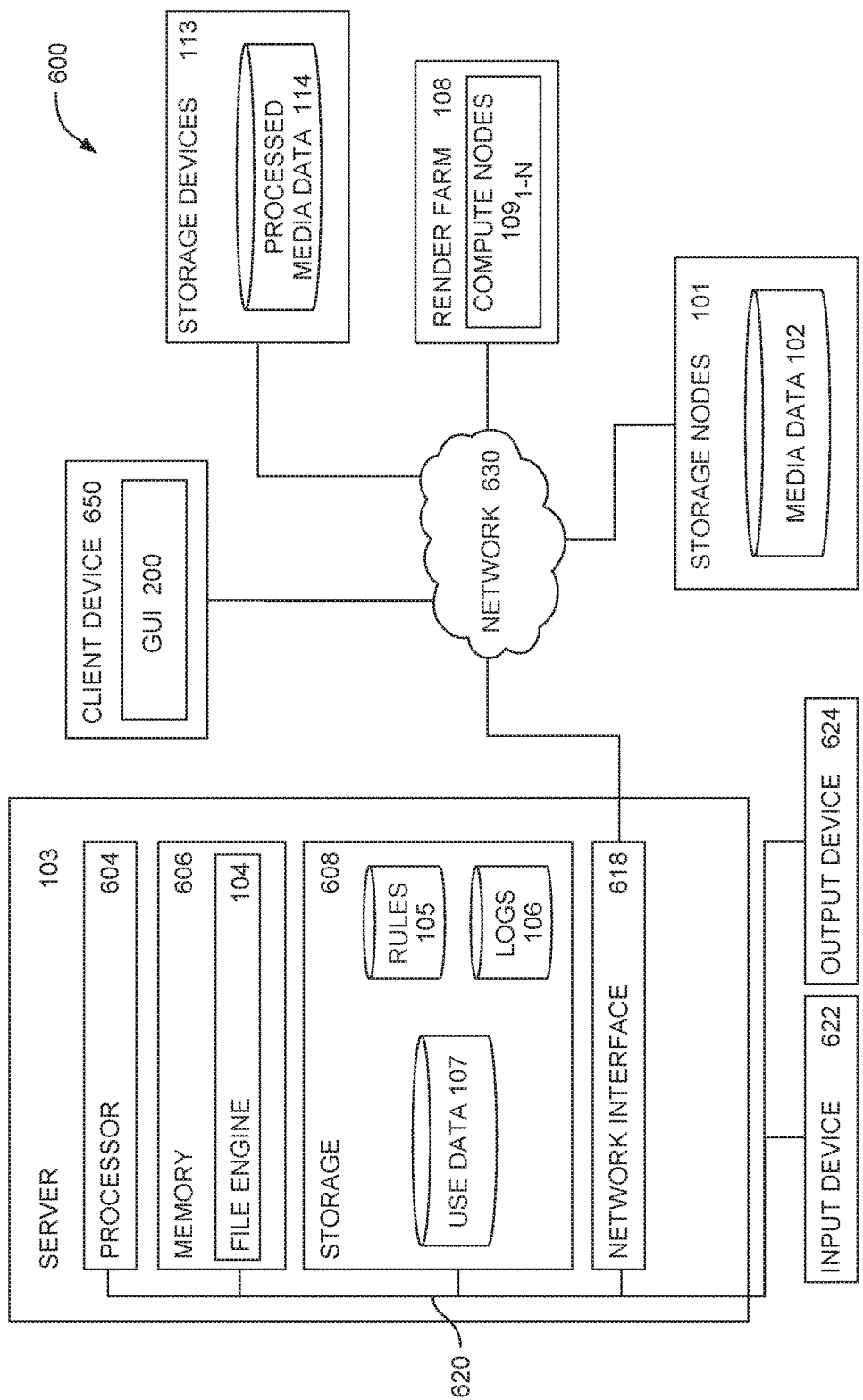
FIG. 6 is a block diagram illustrating a system which provides a high-speed parallel engine for processing file-based high-resolution images, according to one embodiment.

FIG. 6 is a block diagram illustrating a system 600 which provides a high-speed parallel engine for processing file-based high-resolution images, according to one embodiment. The networked system 600 includes the server 103. The server 103 may also be connected to other computers via a network 630, such as the storage nodes 101 and the compute nodes $109_{1-N}$ of the server farm 108. In general, the network 630 may be a telecommunications network and/or a wide area network (WAN). In a particular embodiment, the network 630 is the Internet.

The server 103 generally includes a processor 604 which obtains instructions and data via a bus 620 from a memory 606 and/or a storage 608. The server 103 may also include one or more network interface devices 618, input devices 622, and output devices 624 connected to the bus 620. The server 103 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the server 103 to communicate with other computers via the network 630.

The storage 608 is representative of hard-disk drives, solid state drives, flash memory devices, optical media and the like. Generally, the storage 608 stores application programs and data for use by the server 103. In addition, the memory 606 and the storage 608 may be considered to include memory physically located elsewhere; for example, on another computer coupled to the server 103 via the bus 620.

The input device 622 may be any device for providing input to the server 103. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the server 103. The output device 624 may include output devices such as monitors, touch screen displays, and so on.

As shown, the memory 606 contains the file engine 104, which is configured to schedule and optimize the processing of requests to generate videos received from the GUI 200 executing on a client device 650. As shown, the storage 608 contains the rules 105, logs 106, and use data 107. Generally, the system 600 is configured to implement all functionality described herein.

Advantageously, embodiments disclosed herein provide techniques to make use of a render farm that is fine-tuned for the multi-threaded processing of images stored as files and the relevant transfer to a target system via a high-speed file transfer application. Doing so saturates network connections and optimizes the processing completed by the render farm, resulting in faster times to generate a video responsive to a user request.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the file engine 104 could execute on a computing system in the cloud and receive requests to process image files and audio files into a production-level video. In such a case, the file engine 104 could orchestrate generation of the video, and store the video at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a request to generate a video of a specified resolution based on a plurality of media files, the plurality of media files comprising image files corresponding to a respective frame of a plurality of frames of the generated video;
   determining, via a file engine, a size of a transfer unit based at least in part on the specified resolution and a count of the plurality of media files;
   generating, via the file engine, a plurality of transfer units of the determined size, wherein the plurality of transfer units comprise a respective subset of the plurality of media files; and
   assigning, via the file engine, the plurality of transfer units for parallel processing by a plurality of image processing applications executing on a plurality of compute cores of a plurality of compute nodes in a render farm.

2. The method of claim 1, further comprising:
   processing, by the plurality of image processing applications, the plurality of transfer units to generate the video of a specified resolution; and
   storing the video at a location on a storage device specified in the request.

3. The method of claim 2, wherein the plurality of transfer units are assigned for processing at a specified time in the request, wherein the size of the transfer unit is further determined based on: (i) an estimated use of system resources of the plurality of compute nodes at the specified time, (ii) a bandwidth of a plurality of network segments, (iii) an estimated use of the bandwidth of the plurality of network segments at the specified time, (iv) a size of each of the plurality of media files, and (v) at least one rule for determining the size of the transfer unit.

4. The method of claim 3, wherein the plurality of transfer units are assigned for processing based on: (i) a count of the plurality of transfer units, (ii) a number of compute cores available to process the plurality of transfer units at the specified time, and (iii) an estimated use of bandwidth of a respective network segment communicably coupled to each compute node.

5. The method of claim 4, further comprising:
monitoring a use of the system resources of the plurality of compute nodes and a use of the bandwidth of the plurality of network segments while the plurality of image processing applications process the plurality of transfer units; and
upon determining that at least one of the use of the system resources of the compute nodes or the use of the bandwidth of the plurality of network segments exceeds a threshold, modifying assignment of the plurality of transfer units.

6. The method of claim 1, wherein the request further specifies a plurality of parameters, the plurality of parameters comprising: (i) whether to apply gamma correction to the plurality of image files, (ii) a timeline for assembling each of the plurality of frames of the generated video, (iii) whether to crop each of the plurality of frame of the generated video, or (iv) a combination thereof.

7. The method of claim 1, wherein the plurality of media files further comprise audio files used to generate an audio portion of the video.

8. A computer program product, comprising:
a computer-readable storage medium having computer-readable program code embodied therewith, the computer-readable program code executable by a processor to perform an operation comprising:
receiving a request to generate a video of a specified resolution based on a plurality of media files, the plurality of media files comprising image files corresponding to a respective frame of a plurality of frames of the generated video;
determining, via a file engine, a size of a transfer unit based at least in part on the specified resolution and a count of the plurality of media files;
generating, via the file engine, a plurality of transfer units of the determined size, wherein the plurality of transfer units comprise a respective subset of the plurality of media files; and
assigning, via the file engine, the plurality of transfer units for parallel processing by a plurality of image processing applications executing on a plurality of compute cores of a plurality of compute nodes in a render farm.

9. The computer program product of claim 8, the operation further comprising processing, by the plurality of image processing applications, the plurality of transfer units to generate the video of the specified resolution; and
storing the video at a location on a storage device specified in the request.

10. The computer program product of claim 9, wherein the plurality of transfer units are assigned for processing at a specified time in the request, wherein the size of the transfer unit is further determined based on: (i) an estimated use of system resources of the plurality of compute nodes at the specified time, (ii) a bandwidth of a plurality of network segments, (iii) an estimated use of the bandwidth of the plurality of network segments at the specified time, (iv) a size of each of the plurality of media files, and (v) at least one rule for determining the size of the transfer unit.

11. The computer program product of claim 10, wherein the plurality of transfer units are assigned for processing based on: (i) a count of the plurality of transfer units, (ii) a number of compute cores available to process the plurality of transfer units at the specified time, and (iii) an estimated use of bandwidth of a respective network segment communicably coupled to each compute node.

12. The computer program product of claim 11, the operation further comprising:
monitoring a use of the system resources of the plurality of compute nodes and a use of the bandwidth of the plurality of network segments while the plurality of image processing applications process the plurality of transfer units; and
upon determining that at least one of the use of the system resources of the compute nodes or the use of the bandwidth of the plurality of network segments exceeds a threshold, modifying assignment of the plurality of transfer units.

13. The computer program product of claim 8, wherein the request further specifies a plurality of parameters, the plurality of parameters comprising: (i) whether to apply gamma correction to the plurality of image files, (ii) a timeline for assembling each of the plurality of frames of the generated video, (iii) whether to crop each of the plurality of frame of the generated video, or (iv) a combination thereof.

14. The computer program product of claim 8, wherein the plurality of media files further comprise audio files used to generate an audio portion of the video.

15. A system, comprising:
a computer processor; and
a memory containing a program which when executed by the processor performs an operation comprising:
receiving a request to generate a video of a specified resolution based on a plurality of media files, the plurality of media files comprising image files corresponding to a respective frame of a plurality of frames of the generated video;
determining, via a file engine, a size of a transfer unit based at least in part on the specified resolution and a count of the plurality of media files;
generating, via the file engine, a plurality of transfer units of the determined size, wherein the plurality of transfer units comprise a respective subset of the plurality of media files; and
assigning, via the file engine, the plurality of transfer units for parallel processing by a plurality of image processing applications executing on a plurality of compute cores of a plurality of compute nodes in a render farm.

16. The system of claim 15, the operation further comprising processing, by the plurality of image processing applications, the plurality of transfer units to generate the video of the specified resolution; and
storing the video at a location on a storage device specified in the request.

17. The system of claim 16, wherein the plurality of transfer units are assigned for processing at a specified time in the request, wherein the size of the transfer unit is further determined based on: (i) an estimated use of system resources of the plurality of compute nodes at the specified time, (ii) a bandwidth of a plurality of network segments, (iii) an estimated use of the bandwidth of the plurality of network segments at the specified time, (iv) a size of each of the plurality of media files, and (v) at least one rule for determining the size of the transfer unit.

18. The system of claim 17, f wherein the plurality of transfer units are assigned for processing based on: (i) a count of the plurality of transfer units, (ii) a number of compute cores available to process the plurality of transfer units at the specified time, and (iii) an estimated use of bandwidth of a respective network segment communicably coupled to each compute node.

19. The system of claim 18, the operation further comprising:
- monitoring a use of the system resources of the plurality of compute nodes and a use of the bandwidth of the plurality of network segments while the plurality of image processing applications process the plurality of transfer units; and
- upon determining that at least one of the use of the system resources of the compute nodes or the use of the bandwidth of the plurality of network segments exceeds a threshold, modifying assignment of the plurality of transfer units.

20. The system of claim 15, wherein the request further specifies a plurality of parameters, the plurality of parameters comprising: (i) whether to apply gamma correction to the plurality of image files, (ii) a timeline for assembling each of the plurality of frames of the generated video, (iii) whether to crop each of the plurality of frame of the generated video, wherein the plurality of media files further comprise audio files used to generate an audio portion of the video, or (iv) a combination thereof.

* * * * *